Sept. 19, 1967  S. MATOUSEK  3,342,451
VALVE
Filed April 20, 1964  2 Sheets-Sheet 1

INVENTOR.
STEPHEN MATOUSEK
BY
*Fay & Fay*
ATTORNEYS

Sept. 19, 1967        S. MATOUSEK        3,342,451

VALVE

Filed April 20, 1964        2 Sheets-Sheet 2

INVENTOR.
STEPHEN MATOUSEK
BY
*Fay & Fay*
ATTORNEYS

United States Patent Office 3,342,451
Patented Sept. 19, 1967

3,342,451
VALVE
Stephen Matousek, Chelmsford, Mass., assignor to Nupro Company, a corporation of Ohio
Filed Apr. 20, 1964, Ser. No. 360,977
9 Claims. (Cl. 251—77)

This application refers to valves and more particularly to a metering valve which provides variable flow characteristics but which is operable in the manner of a toggle valve or other types of longitudinally reciprocating valves.

The principles of this invention are embodied in a valve which is designed to be opened to a desired flow rate by a longitudinal reciprocating motion of a minimum specified distance rather than the conventional rotational motion heretofore utilized. The valve orifice opening is controlled separately but integrally with the opening mechanism. The flow rate of the valve may be varied from zero to a maximum setting using a constant longitudinal opening motion. Once the desired flow rate has been set, the valve may be opened repeatedly to the desired flow by using the same, constant longitudinal opening motion.

Contrasted with these desirable features is the known type of metering valve which utilizes a threaded connection to impart longitudinal reciprocation to the valve stem. Such a threaded connection contemplates a varying amount of rotation of the operating mechanism to vary the flow rate of the valve. Accordingly, if a series of metering valves are being utilized, it is necessary to adjust each valve individually so as to assure the proper flow rate through each valve. Moreover, the settings of the valve are not reproducible and it is difficult to obtain the identical flow rate with each operation of the valve.

It is an object of this invention to provide a metering valve which incorporates the operating characteristics of a reciprocating on-off valve.

It is another object of this invention to provide a metering valve having a rapid opening feature.

A further object of this invention is to provide a metering valve which, when used with a series of valves of the same design, may be opened by a common stroke mechanism but still have an individual flow rate.

An additional object of this invention is to provide a valve wherein the operating mechanism is disposed out of the flow path thereby providing protection of the operating mechanism from corrosion.

Another feature of the invention is the provision of an adjustable stop mechanism whereby the flow rate of the valve may be reproducible with each operation of the valve.

A further feature of the invention is the provision of a metering valve wherein a constant longitudinal reciprocation may be imparted to the operating stem but wherein various flow rates may be accomplished.

More specifically, the valve comprises a valve body having a longitudinal cavity extending therethrough, with said body further including an inlet port seat coaxial with the cavity and an outlet port with flow control means in the cavity. The flow control means includes a longitudinally reciprocable member having an inlet sealing means at one end thereof. A longitudinally reciprocable stem in the cavity is operatively interconnected with said member and is adapted to impart reciprocable movement to said member whereby said sealing means is reciprocated into and out of sealing engagement with the inlet port seat. Adjustable stop means are provided in the cavity with an adjustment means exterior of said body operatively connected to said stop means for adjusting the position of said stop means longitudinally of the cavity. Abutment means are provided on said member with the abutment means being adapted to engage said stop means and thereby limit the range of reciprocation of said member.

To the accomplishment of the foregoing and related ends, the following description sets forth in detail a selected embodiment of the invention; such disclosed means are not meant to be limiting, being but one of the various ways in which the principles of the invention may be used.

In the drawings wherein like reference numerals indicate like parts in the various views.

Figure 2:
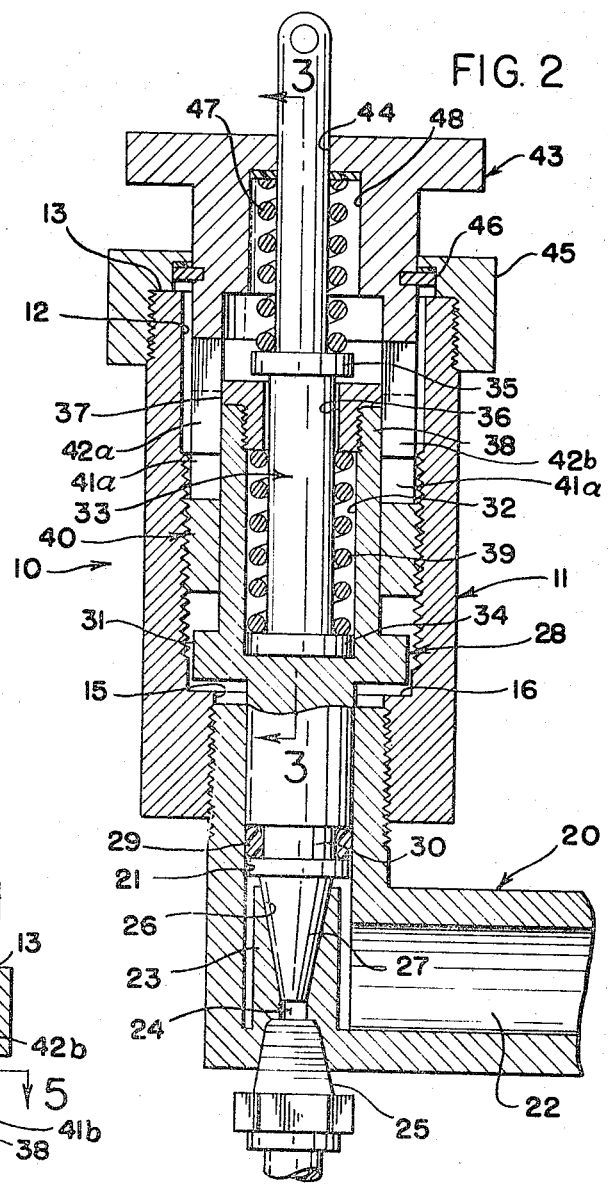
FIG. 2 is a longitudinal section view of the valve incorporating the principles of the instant invention, with the valve being shown in the closed position.
Figure 3:
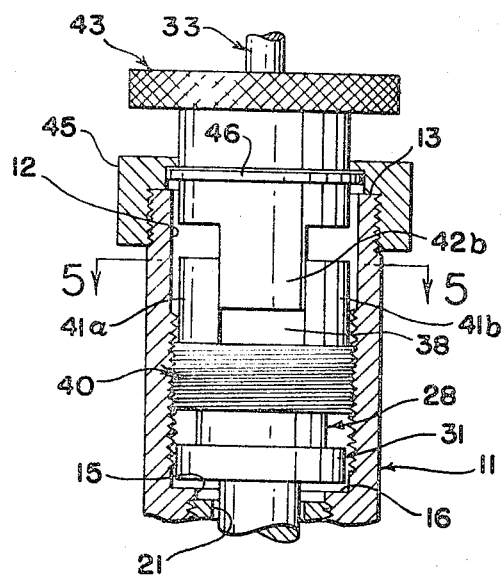
FIG. 3 is a sectional view taken along line 3—3 of FIG. 1 and illustrates the adjustable stop mechanism.
Figure 5:
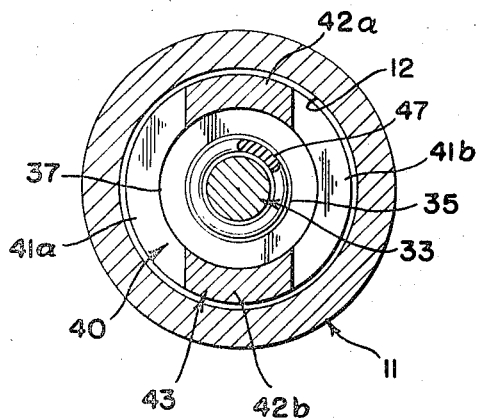
FIG. 5 is a sectional view taken along line 5—5 of FIG. 3.
Figure 4:
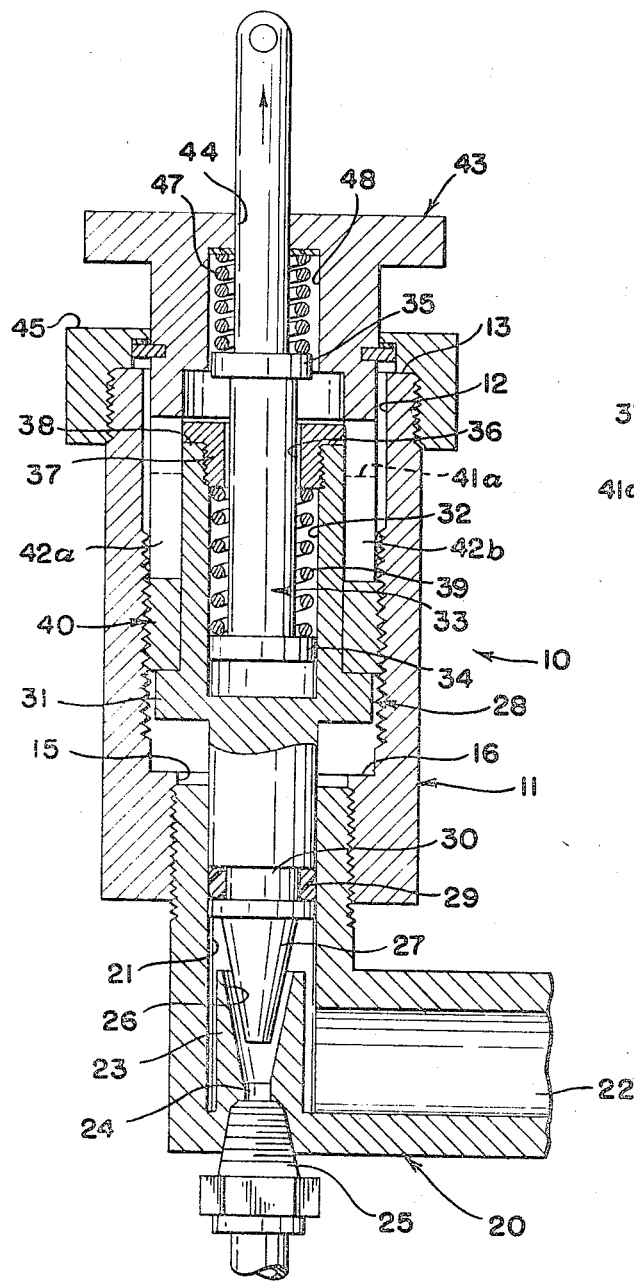
FIG. 4 is a longitudinal sectional view similar to FIG. 2 illustrating the valve in the open position.

Referring now to FIG. 2, the metering valve, indicated generally by the reference numeral 10, includes a valve body 11 having a cavity 12 therein. The cavity 12 opens upwardly of one end 13, with the other end of the body 11 having a bore 15 which is reduced in diameter relative to the central cavity 12. A transverse shoulder 16 is formed at the juncture of the central cavity 12 and the bore 15.

Threadedly received in the bore 15 is an elbow member 20. The elbow member includes intersecting passages 21, 22, with the passage 21 being coaxial with the central cavity 12 and comprising an inlet passage. A seating pedestal 23 having an inlet port 24 is formed in the passageway 21. The end 25 of a fluid conduit is threadedly received in the elbow member in fluid communication with the inlet port 24 whereby fluid in the line 25 may pass inwardly of the port 24 and then out of the elbow through the passage 22.

The inlet port 24 includes a conically shaped valve seat 26 which is adapted to receive a similarly conical shaped valve plug 27. The valve plug 27 is integral with a reciprocating member or stem, generally indicated by the reference numeral 28. The reciprocating member 28 is slidably received in the passage 21 of the elbow member 20 with an O-ring seal 29 disposed in a groove 30 formed in the reciprocating member adapted to engage the sides of the passage 21 and thereby seal the central cavity 12 from the fluid in the elbow member. The reciprocating member 28 further includes a flange 31 which is adapted to abut the transverse shoulder 16 of the valve body 10 during assembly of the valve. Once assembled, the flange is normally spaced from the shoulder 16.

To impart reciprocation to the member 28 and thereby displace the valve plug 27 from its seat in the pedestal 23, there is provided in the reciprocating member a bore 32 in which there is received a stem 33. The stem 33 includes a flange 34 at one end thereof and a second flange 35 intermediate its longitudinal extent. The flange 35 is a separate member that is slipped over the upper end of stem 33 and rests on an intermediate shoulder on stem 33. The flange 34 is designed to have a close tolerance fit with bore 32. This close fit permits creation of a pressure or a vacuum in the bottom of bore 32 depending on the direction of movement of flange 34 in the bore. The bore 32 and flange 34 act as a shock absorber and also tend to dispose immediate action to member 28 as will appear more fully hereinafter.

The stem 33 protrudes through a bore 36 in a nut 37 with the nut 37 being threadedly secured to the upper end 38 of the reciprocating member 28 and serving to close the bore 32 formed in the reciprocating member. A coil spring 39 surrounds the portion of the stem disposed in the bore 32 with the coil spring being interposed between the nut 37 and the flange 34 on the stem 33. The action of the coil spring serves to bias the stem to a position wherein the flange 34 abuts the floor of the bore 32.

It is believed apparent that, as viewed in FIG. 2, with an upward movement of the stem 33, the spring 39 will be compressed between the flange 34 and the nut 37. As the compression of the spring increases, the biasing force of the spring on the nut 37 will increase to a magnitude wherein the reciprocating member 28 will move in an upward direction, as viewed in FIG. 2. The movement of the reciprocating member 28 will effect a displacement of the valve plug 27 from its conical seat 26 in the pedestal 23 and thereby permit the flow of fluid through the inlet port 24 to the outlet port 22. It is to be noted that, as the extent of movement of the member 28 increases, the greater the area of the inlet port that will be exposed so that the greater will be the amount of fluid permitted to flow.

It is to be emphasized that the stem 33 is not directly connected to the reciprocating member 28 so that, assuming the reciprocating member 28 is restrained, the stem 33 may move independently of such member with the net effect being that the spring 39 will become compressed but no movement will be effected of the reciprocating member. The importance of this lost motion will become more apparent as the description proceeds.

To limit the upward movement of the member 28 and provide a means for accurately setting the metering effect of the valve, there is provided a stop nut 40. The stop nut 40 is threadedly received in the central cavity 12 so that, with the rotation of the nut relative to the valve body 10, the nut will effect a longitudinal movement within the cavity 12. The flange 31 on the member 28 is designed to abut the stop nut 40 so that the stem 28 will be displaced longitudinally in the cavity 12 only until such time as the flange engages the stop nut 40. Thereafter, further movement of the reciprocating member will be restrained.

The stop nut 40 includes a pair of circumferentially spaced apart lugs 41a, 41b. Meshing with the lugs 41a, 41b are corresponding pairs of circumferentially spaced lugs 42a, 42b which depend from an operating handle 43. The operating or adjusting handle 43 is telescopically received over the end 38 of the reciprocating member 28 and includes a central bore 44 through which the upper end of the stem 33 projects. The handle 43 is rotatably secured in the bonnet 45 of the valve by a locking ring 46 which permits rotation of the handle 43 relative to the bonnet 45 but restrains the handle from longitudinal movement. A spring 47 is received in a recess 48 formed in the body of the handle 43 with the spring being interposed between the flange 35 and the bottom of the recess 48. The spring 47 serves to bias the stem in a direction wherein the flange 34 would abut the bottom of the bore 32 in the reciprocating member 28.

Figure 1:
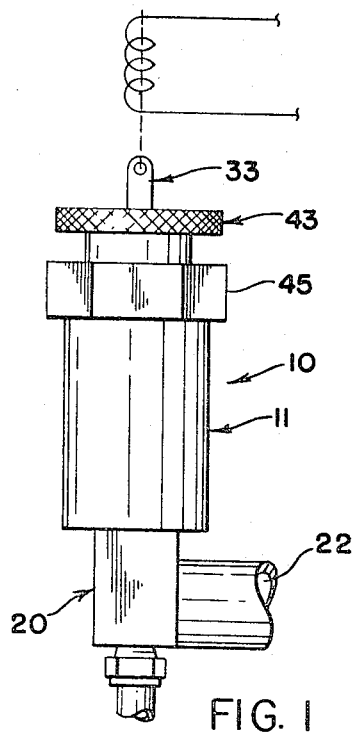
FIG. 1 is a side elevation illustrating the valve mechanism with a solenoid operator.

Keeping in mind the above-described elements, the operation of the valve is as follows: Assuming the valve to be in the position shown in FIG. 2, the passage 22 is connected to a suitable outlet and fluid line 25 is connected to a source of fluid. The actuator for the valve may be in the form of a solenoid, cam, lever or toggle arrangement, with a solenoid arrangement being schematically illustrated in FIG. 1. When it is desired to open the valve, the solenoid is actuated to effect a displacement of the valve stem 33 in an upward direction as viewed in FIG. 2. Since the stem 33 is not directly connected to the reciprocating member 28, the valve plug 27 will remain seated in the conical seat 26 until such time as the upward movement of the stem 33 has caused compression of the spring 39. When the compression of the spring has attained a predetermined level, the spring will bias the reciprocating member 28 in a corresponding upward direction thereby removing the plug 27 from the conical seat 26 and permitting the flow of fluid through the inlet port 24. Continued upward movement of the stem 33 will cause a continued compression of the spring 39 and a consequent longitudinal movement of the reciprocating member 28 until such time as the flange 31 on the member 28 engages the stop nut 40. When this condition exists, further movement of the stem 33 will merely effect a compression of the spring 39 without a corresponding continued movement of the member 28. When the operator is deactivated and the valve is to be closed, the spring 47 which was compressed during the longitudinal movement of the stem 33 will bias the stem 33 to a position where the flange 34 is bottomed against the reciprocating member 28 and cause the reciprocating member 28 to be displaced to a position wherein the valve plug 27 is received in the conical seat 26 and the flow of fluid is discontinued. In actual practice, the close fit of the flange 34 in the bore 32, coupled with the rapid movement of the flange 34 under the bias of the spring 39, creates a pressure in bore 32 which forces member 28 in a closing direction before the flange 34 has reached a bottoming position. The compressed air meters out during the closing cycle thereby allowing a comparatively soft impact force between the flange 34 and the member 28.

If it is desired to adjust the flow rate of the valve, one need only rotate the adjusting handle 43. With rotation of the handle 43, the meshing lugs 41, 42 which, in essence, constitute a clutch, impart a corresponding rotation to the stop nut 40. Since the stop nut is threadedly secured in the cavity of the valve body 11, rotation of the stop nut will also effect a longitudinal displacement of the nut. The longitudinal displacement of the nut relative to the handle 43 is accommodated through the sliding, meshing engagement of the lugs 41, 42. When the proper position of the stop nut has been located longitudinally of the cavity 12, rotation of the handle 43 is discontinued and the valve is ready for operation. Upon consequent operation of the valve and longitudinal displacement of the stem 33, the reciprocating member 28 will be displaced to a position which is determined by the new position of the stop nut 40 and therefore a correspondingly different flow rate will be obtained due to the different exposed area of the inlet opening 24.

Several features are to be emphasized. Thus, it is to be noted that the operating mechanism, both for adjusting the flow rate and the operating mechanism for the valve, are isolated from the fluid in the system. Such an arrangement provides a desirable feature when corrosive fluids are being used. The valve also includes the desirable features of an on-off valve wherein a longitudinal displacement of the operating mechanism is utilized and this longitudinal displacement has been incorporated in a metering valve. With such an arrangement, it is now possible to use a series of metering valves which are opened by a common stroke mechanism but which continue to have individual flow rates. Thus, assuming a plurality of valves which are operated by a single mechanism having a fixed stroke or range of movement, each valve may have its stop nut 40 adjusted to a different position thereby providing a variety of flow rates despite the common operator or a series of equal flow rates using various inlet pressures or fluid viscosities. Such arrangements are possible due to the lost motion connection between the stem 33 and the reciprocating member 28 so that the stems 33 of each valve in the group may be given a predetermined displacement of a specified distance with the corresponding movements of the reciprocating members in each valve being different.

Another feature of the valve is the rapid opening effected due to the spring 39 which, when it has been compressed to a certain predetermined level, effects a snap opening of the valve plug away from the conical seat 26. Moreover, there is the desirable feature that once the stop nut 40 has been adjusted to a predetermined flow rate, the valve may be used as an on-off valve as well as a metering valve thereby eliminating the need for both an on-off valve and a metering valve in the same system. Thus, the particular setting of the valve is reproducible over a multitude of operations of the valve due to the setting of the stop nut and whenever it is desired to discontinue the flow of the fluid, the valve need only be deactivated and the fluid flow will be terminated. When the flow is to be commenced again, the valve is actuated and the predetermined flow rate is once again obtained.

One further feature is the provision of a positive shut-off arrangement. Thus, although the spring 39 is the intermediary whereby the motion of the stem 33 is transmitted to the reciprocating member 28 during the opening movements of the valve, the converse is not true. That is, when the valve stem 33 is displaced in a direction for closing the valve, the spring 39 plays no part in the closing movement and the flange 34 bottoms in the bore 32 thereby providing a direct connection between the stem 33 and the reciprocating member 28.

A positive shut-off may also be obtained by turning nut 40 against flange 31 thereby holding member 28 in a closed position. This relationship permits a valve to be "locked out" of a series or system while still being actuated by the common operator. This relationship also constitutes a safety feature in that the valve would not open if "locked out" and the operator was accidentally actuated.

Finally, the nonrotating stem helps prevent seat galling thereby extending the valve life. The valve life is further enhanced by the shock absorbing chamber defined by the flange 34 and bore 32 which minimizes the shock occurring from the snap-shut action of the spring 39.

For ease of description, the principles of the invention have been set forth in connection with but a single illustrated embodiment. It is not my intention that the illustrated embodiment or the terminology employed in describing it be limiting inasmuch as variations in these may be made without departing from the spirit of the invention, but rather, it is my desire to be restricted only by the scope of the appended claims.

I claim:

1. A metering valve comprising a valve body having a longitudinally extending central cavity formed wherein:
   an inlet port communicating with the central cavity;
   inlet port closure means in the central cavity and being movable toward and away from the inlet port;
   stem means disposed in the cavity, with one end of said stem projecting exterior of the valve body; and
   resilient means interposed between the other end of said stem and said inlet port closure means;
   movement of said stem means in one direction compressing said resilient means between said stem means and said closure means with said resilient means preventing engagement of said stem means with said closure means in said one direction.

2. The combination of claim 1 further including additional resilient means associated with said stem means and being operative to bias said stem means in a direction opposite to said one direction whereby said stem means abuts said inlet closure means.

3. A metering valve comprising a valve body having a longitudinally extending central cavity formed therein;
   an inlet port communicating with the central cavity;
   inlet port closure means in the central cavity and being movable toward and away from the inlet port;
   stem means disposed in the cavity with one end of said stem means projecting exterior of the valve body;
   resilient means interconnecting the other end of said stem means with said inlet port closure means whereby movement of said stem means in one direction resiliently urges said inlet closure means in the same direction; and
   means for limiting the range of movement of said closure means;
   said movement limiting means comprising adjustable nut means threaded in the cavity of said body;
   abutment means on said port closure means adapted to engage said nut means; and
   handle means rotatably mounted on said body, said handle means including coupling means projecting into the cavity;
   said coupling means being connected to said nut means whereby rotation of said handle effects rotative and longitudinal movement of said nut means thereby to adjust the position of said nut means in the cavity.

4. A valve comprising:
   a body having a longitudinal cavity internally thereof;
   said body further including inlet and outlet ports in communication with the cavity;
   closure means in the cavity of said body adapted to be reciprocated into and out of engagement with the inlet port;
   valve actuating means including a stem projecting into the cavity in said body;
   first resilient means biasing said stem means in a first direction wherein a portion of said stem means is in abutment with said closure means thereby moving said closure means to a position of sealing engagement with the inlet port; and
   second resilient means operatively associated with said stem means and said valve closure means;
   said second resilient means preventing engagement between said stem means and said valve closure means in a second direction of movement of said stem means.

5. A valve comprising:
   a valve body having inlet and outlet passages;
   a valve seat adjacent the inlet port;
   inlet port closing means internally of said body and being movable toward and away from said inlet seat;
   actuating means operatively associated with said closing means for effecting the movement of said closing means;
   stop means in the interior of said valve body operative to limit the range of movement of said inlet closing means;
   a handle rotatably mounted on said valve body;
   means on said valve body preventing longitudinal movement of said handle; and
   means interconnecting said handle with said stop means whereby rotation of said handle effects longitudinal movement of said stop means relative to said valve body.

6. A metering valve comprising:
   a valve body having an inlet port and an outlet port;
   a passageway in said body interconnecting the inlet and outlet port;
   fluid metering means in the passageway adjacent the inlet port;
   said fluid metering means including a reciprocating member movable toward and away from the inlet port;
   longitudinally movable stem means in said valve body;
   actuating means associated with said stem means operable to displace said stem means through a given longitudinal movement with each actuation thereof;
   means interconnecting said stem means with said reciprocating member;
   said interconnecting means including means whereby said stem may be displaced independently of said member at least in one direction of movement thereof;
   stop means in the passageway;
   adjustment means exterior of said body;
   means interconnecting said stop means with said adjustment means for adjusting the position of said stop means longitudinally of the passageway; and
abutment means on said member adapted to engage said stop means thereby to limit the range of reciprocation of said member.

7. The combination of claim 6 and further including resilient means interposed between said stem means and said adjustment means; and
means restricting movement of said adjustment means to rotation relative to said body.

8. A metering valve comprising:
a valve body having a central cavity formed therein;
an elbow member threadedly received in one end of said valve body;
said elbow member including an inlet passage coaxial with the central cavity in said valve body and an outlet passage intersecting said inlet passage;
a reciprocating member in the central cavity;
said reciprocating member including plug means adapted to close said inlet passage;
said reciprocating member further including a central recess formed therein;
nut means threadedly received in said recess and serving to close the open end thereof;
a valve stem received in the recess, with one end of said stem projecting out of said recess through a bore in said nut means;
a flange formed on the end of the stem in the recess;
spring means encircling said stem in the recess, with said spring being interposed between said flange and said nut means thereby biasing said stem to a position wherein said flange engages the bottom of the recess;
bonnet means on said valve body, said bonnet means including an enlarged central bore aligned with the central cavity with said one end of the stem projecting through the bore in said bonnet;
adjustable stop nut means threadedly mounted in the interior of the cavity;
abutment means on said reciprocating member adapted to engage said stop nut means and thereby limit the range of movement of said reciprocating member;
adjustable handle means rotatably mounted in the bore of said bonnet means;
said adjustable handle means including depending lugs projecting into the central cavity;
said stop nut means including lugs in meshing engagement with said lugs of said adjusting handle whereby rotation of said adjusting handle imparts rotation to said stop nut means; and
resilient means associated with said adjustable handle and said stem whereby said stem and said reciprocating member are biased to a position wherein the valve plug closes the inlet port.

9. A metering valve comprising a valve body having a longitudinally extending central cavity formed therein;
an inlet port communicating with the central cavity;
inlet port closure means in the central cavity and being movable toward and away from the inlet port;
stem means disposed in the cavity with one end of said stem means projecting exterior of the valve body;
resilient means interconnecting the other end of said stem means with said inlet port closure means whereby movement of said stem means in one direction resiliently urges said inlet closure means in the same direction;
said inlet port closure means including a reciprocable member having a bore formed in a portion thereof;
said stem means being slidably received in said bore;
a flange on said other end of said stem closely fitting with the walls of the bore;
said resilient means encircling said stem and being interposed between said flange and said reciprocable member.

References Cited
UNITED STATES PATENTS

| | | | |
|---|---|---|---|
| 1,305,997 | 6/1919 | Fortney | 251—285 X |
| 1,991,052 | 2/1935 | Derby | 251—285 X |
| 2,041,416 | 5/1936 | Johnson | 251—76 |
| 2,222,419 | 11/1940 | McCarty | 251—76 X |
| 2,392,741 | 1/1946 | Hurlburt | 251—138 X |
| 2,817,545 | 12/1957 | Uhler | 251—266 |
| 2,827,923 | 3/1958 | Sadler | 251—77 X |
| 2,924,421 | 2/1960 | Pohndorf | 251—266 |
| 2,977,087 | 3/1961 | Lindgren et al. | 251—285 X |
| 3,098,637 | 7/1963 | Baustian | 251—285 X |

FOREIGN PATENTS 964,651    5/1957    Germany.

M. CARY NELSON, *Primary Examiner.*

S. SCOTT, *Assistant Examiner.*